(12) United States Patent
Ye et al.

(10) Patent No.: US 9,134,828 B2
(45) Date of Patent: Sep. 15, 2015

(54) TOUCH PANEL HAVING A SHIELDING STRUCTURE AND METHOD OF MANUFACTURING THE SAME

(75) Inventors: Huilin Ye, Xiamen (CN); Jing Yu, Xiamen (CN); Qunfeng Lin, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 13/467,989

(22) Filed: May 9, 2012

(65) Prior Publication Data
US 2013/0062179 A1 Mar. 14, 2013

(30) Foreign Application Priority Data
Sep. 10, 2011 (CN) .......................... 2011 1 0281019

(51) Int. Cl.
*H01H 1/10* (2006.01)
*G06F 3/041* (2006.01)

(52) U.S. Cl.
CPC ...... *G06F 3/041* (2013.01); *G06F 2203/04103* (2013.01); *G06F 2203/04107* (2013.01); *Y10T 29/49155* (2015.01); *Y10T 29/49162* (2015.01); *Y10T 29/49165* (2015.01)

(58) Field of Classification Search
CPC ......... H01H 1/10; H01H 43/08; H01H 13/70; H01H 25/00; H01H 25/04; H01H 1/02; H01H 9/02; H01H 13/04; H01H 19/04; H01H 21/04; H03K 17/975; G06F 3/041
USPC .......... 200/600, 46, 5 R, 292, 511–512, 11 D, 200/11 DA, 5 A, 305; 345/173
See application file for complete search history.

(56) References Cited

U.S. PATENT DOCUMENTS

| 4,700,025 | A | * | 10/1987 | Hatayama et al. | ............. 200/5 A |
| 7,864,503 | B2 | * | 1/2011 | Chang | ............ 361/288 |
| 8,040,321 | B2 | * | 10/2011 | Peng et al. | .................... 345/169 |
| 2008/0007534 | A1 | | 1/2008 | Peng et al. | |
| 2008/0143683 | A1 | * | 6/2008 | Hotelling | ....................... 345/173 |
| 2009/0314621 | A1 | * | 12/2009 | Hotelling | ....................... 200/600 |

(Continued)

FOREIGN PATENT DOCUMENTS

| CN | 101578574 | | 11/2009 |
| CN | 101614895 | A | 12/2009 |

(Continued)

*Primary Examiner* — Renee S Luebke
*Assistant Examiner* — Anthony R. Jimenez
(74) *Attorney, Agent, or Firm* — Gokalp Bayramoglu

(57) ABSTRACT

The present disclosure relates to a touch panel having a shielding structure and a method of manufacturing the same. The touch panel having a shielding structure comprises a conductive ring disposed on periphery of an upper surface of a substrate, a shielding layer disposed on a lower surface of the substrate, and a plurality of conductive connection points electrically connecting the shielding layer and the conductive ring. By connecting the shielding layer and the conductive ring by the conductive connection points, impedance of the shielding layer is consistent for different distances between the shielding layer and flexible printed circuit, thereby eliminating noise interference from a liquid crystal display or an electronic device under the touch panel, while using the touch panel. Moreover, the manufacturing method of the touch panel with a shielding structure is a simple process, which reduces the manufacturing cost.

28 Claims, 5 Drawing Sheets

(56) References Cited

U.S. PATENT DOCUMENTS

| | | | |
|---|---|---|---|
| 2010/0001972 A1* | 1/2010 | Jiang et al. | 345/173 |
| 2010/0085326 A1* | 4/2010 | Anno | 345/174 |
| 2011/0109583 A1* | 5/2011 | Lee | 345/174 |
| 2011/0141034 A1 | 6/2011 | Lai et al. | |
| 2011/0226601 A1* | 9/2011 | Blakely | 200/512 |

FOREIGN PATENT DOCUMENTS

| | | |
|---|---|---|
| CN | 201465086 U | 5/2010 |
| JP | 2009086184 A | 4/2009 |
| JP | 2010140370 A | 6/2010 |
| TW | 331145 | 4/2008 |
| TW | 200901013 | 1/2009 |
| TW | 380534 | 5/2010 |
| TW | 201128505 | 8/2011 |

* cited by examiner

TOUCH PANEL HAVING A SHIELDING STRUCTURE AND METHOD OF MANUFACTURING THE SAME

This application claims the benefit of Chinese application No. 201110281019.4, filed on Sep. 10, 2011.

BACKGROUND OF THE INVENTION

1. Field of the Invention

The present disclosure relates to a touch panel, especially to a touch panel having a shielding structure and method of manufacturing the same.

2. Description of the Related Art

Touch panels can, based on different sensing principles, be classified into resistive type, capacitive type, acoustic wave type, optical type and so on. Touch panels typically determine a touch location by detecting changes in electrical signals, optical signals and acoustic wave signals.

In a conventional electronic device integrated with a touch panel, a shielding layer is formed between the touch panel and the electronic device, and one end of the shielding layer is electrically connected to a shielding pin of a flexible printed circuit (FPC). The shielding layer can absorb noise from the electronic device, and the noise is then released via the shielding pin of the FPC.

However, impedance of the shielding layer is low at the FPC end and is high at the end far away from the FPC. Also, effect of the shielding noise is weakened by inconsistency in impedance of the shielding layer. Thus, noise interference from the electronic device cannot be avoided when using the touch panel.

SUMMARY OF THE INVENTION

In view of the above-mentioned, the present disclosure provides a touch panel having a shielding structure and a method of manufacturing the same, using a wrap-around conductive ring to electrically connect the shielding layer such that impedance of the shielding layer is consistent even if the distance between the shielding layer and the shielding pin is different, thereby solving the problem of noise interference.

Touch panel of the present disclosure having a shielding structure comprises: a conductive ring disposed on periphery of an upper surface of a substrate; a shielding layer disposed on a lower surface of the substrate; and a plurality of conductive connection points electrically connecting the shielding layer and the conductive ring.

Another objective of the present disclosure is to provide a method of manufacturing a touch panel having a shielding structure comprising: forming a shielding layer on a lower surface of a substrate; forming a conductive ring on periphery of an upper surface of the substrate; and disposing a plurality of conductive connection points electrically connecting the shielding layer and the conductive ring.

By means of the touch panel with a shielding structure provided in the present disclosure, impedance of the shielding layer will be consistent for different distances between the shielding layer and the FPC, to eliminate noise interference from a liquid crystal display or an electronic device under the touch panel, while using the touch panel.

BRIEF DESCRIPTION OF THE DRAWINGS

For those skilled in the art, embodiments and drawings described below are for illustration purposes only and do not limit the scope of the present disclosure in any manner.

DETAILED DESCRIPTION OF THE EMBODIMENTS

Figure 1:
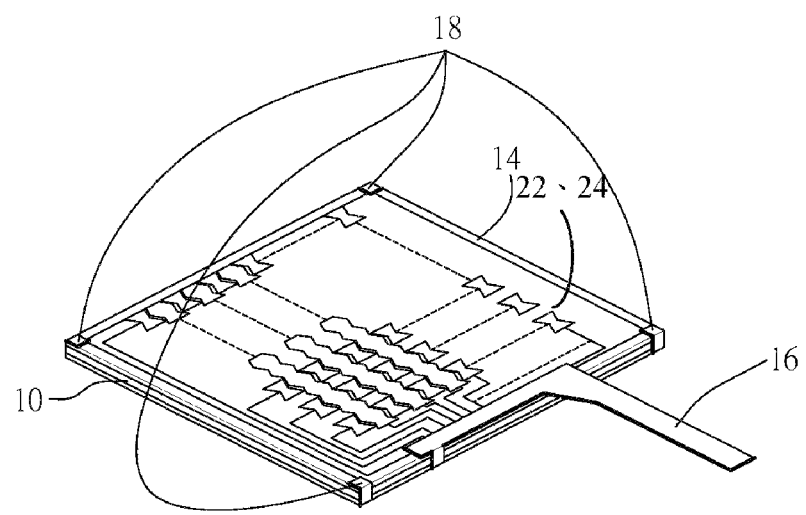
FIG. 1 is a schematic view of an upper surface of a substrate of a touch panel with a shielding structure in accordance with the present disclosure.
Figure 2:
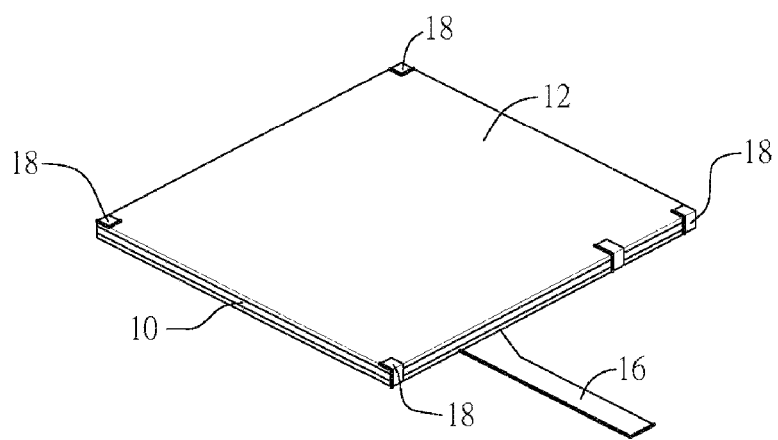
FIG. 2 is a schematic view of a lower surface of a substrate of a touch panel with a shielding structure in accordance with the present disclosure.

FIG. 1 and FIG. 2 show a touch panel having a shielding structure in accordance with the present disclosure. The touch panel having a shielding structure comprises a substrate 10, a shielding layer 12, a conductive ring 14 and a plurality of conductive connection points 18. The conductive ring 14 is disposed on periphery of an upper surface of the substrate 10 of the touch panel and the shielding layer 12 is disposed on a lower surface of the substrate 10. The shielding layer 12 is a conductive layer, such as a metal layer or an Indium tin Oxide (ITO) layer. The touch panel having a shielding structure further comprises a plurality of electrodes 22 and 24 surrounded by the conductive ring 14. In different embodiments, the conductive ring 14 can be made of a metal or a transparent conductive material, such as ITO or a combination thereof. The conductive ring 14 is electrically connected to a shielding pin of a FPC. In different embodiments, the shielding layer 12 is a plane structure or a mesh structure, and the shielding layer 12 is grounded.

A plurality of conductive connection points 18 are used for electrically connecting the shielding layer 12 and the conductive ring 14. In different embodiments, disposing positions of the conductive connection points 18 can either be at four corners of the substrate 10 or on four edges of the substrate 10, and each edge has at least one conductive connection point 18. The conductive connection points 18 can be disposed on the sides of the substrate 10. The substrate 10 further comprises a plurality of through-holes (not shown) which are disposed at the position corresponding to the shielding layer 12 and the conductive ring 14, and the conductive connection points 18 are disposed in the through-holes.

The above disposing positions and disposing ways of the conductive connection points 18 can be combined freely to achieve electrical connection of the shielding layer 12 with the conductive ring 14. For example, FIG. 1 and FIG. 2 show conductive connection points 18 are disposed at four corners of the substrate 10 and on the sides of the substrate 10 to electrically connect the shielding layer 12 and the conductive ring 14. The conductive connection points 18 can be made of a silver paste or a conductive tape.

Figure 3:
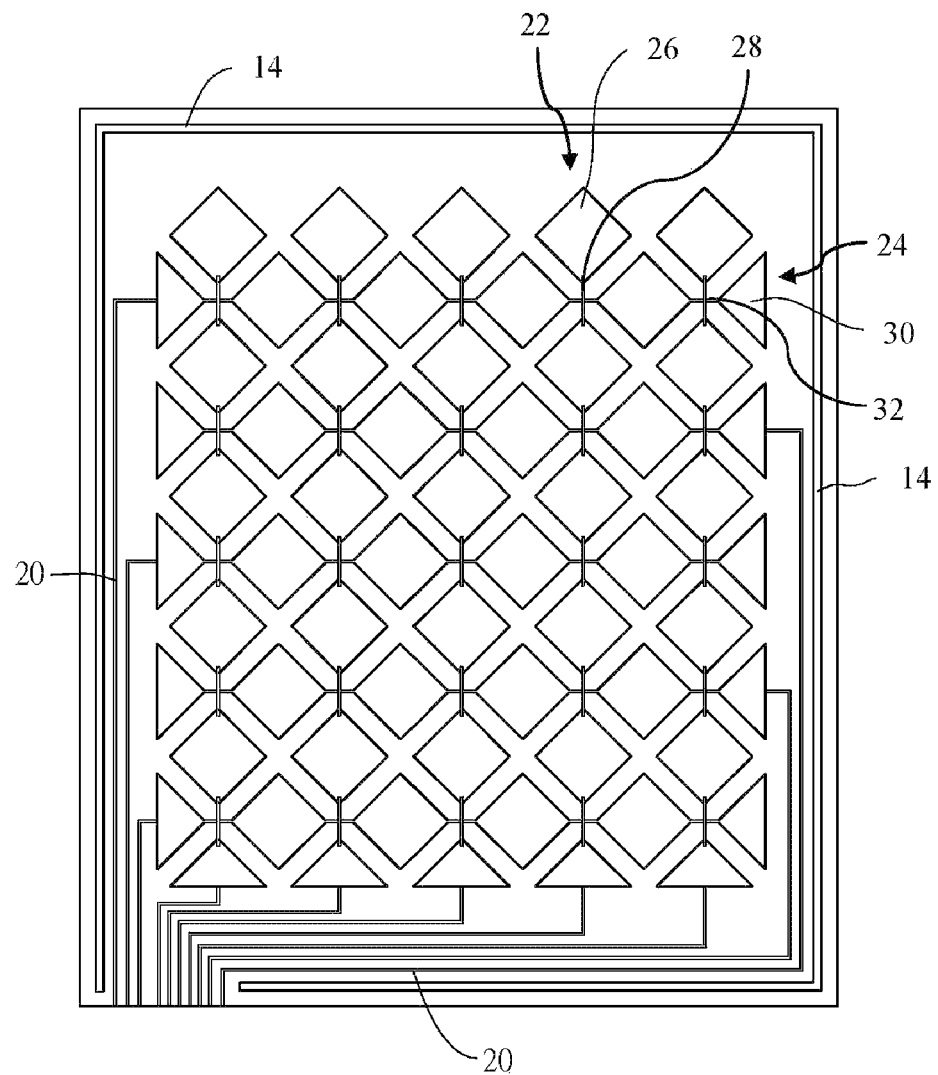
FIG. 3 is schematic top view of an upper surface of a substrate of a touch panel with a shielding structure in accordance with the present disclosure.
Figure 4:
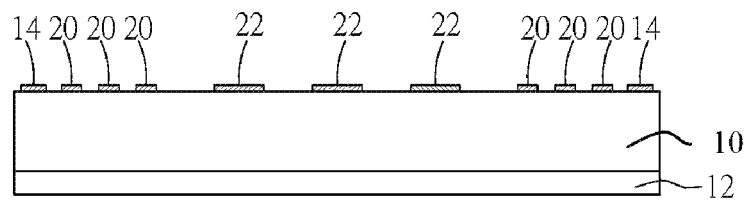
FIG. 4 is a schematic sectional view of a touch panel with a shielding structure in accordance with the present disclosure.

Referring to FIG. 3 and FIG. 4, electrodes formed on upper surface of the substrate 10 include vertical electrodes 22 and horizontal electrodes 24. Peripheral wires 20 are formed on the periphery of the upper surface of the substrate 10, wherein the peripheral wires 20 electrically connect the vertical electrodes 22 and the horizontal electrodes 24 and are used for outputting signals generated by the vertical electrodes 22 and horizontal electrodes 24. Each vertical electrode 22 further comprises a plurality of vertical conductive units 26 and a plurality of vertical wires 28, which electrically connect the vertical conductive units 26. Similarly, each horizontal electrode 24 comprises a plurality of horizontal conductive units 30 and a plurality of horizontal wires 32 that electrically connect the horizontal conductive units 30.

In a preferred embodiment, the peripheral wires 20, the vertical wires 28, horizontal wires 32, and the conductive ring 14 are made of same material. In different embodiments, the peripheral wires 20, the vertical wires 28, horizontal wires 32 and the conductive ring 14 can be made of same metal, transparent conductive material, or a combination thereof.

A method of manufacturing a touch panel having a shielding structure in accordance with the present disclosure is now disclosed. Steps of the following embodiments can be adjusted based on the actual manufacture of a touch panel but used for limiting the manufacturing method of the present disclosure in any manner. Steps which are irrelevant to the manufacturing method of the present disclosure are omitted.

Referring to FIGS. 1-4, a shielding layer 12 is formed on lower surface of a substrate 10; next, a plurality of vertical electrodes 22, a plurality of horizontal electrodes 24, and a conductive ring 14 are formed on an upper surface of the substrate 10, wherein the conductive ring 14 surrounds the vertical electrodes 22 and the horizontal electrodes 24; and then, a plurality of conductive connection points 18 are disposed on the substrate 10 to electrically connect the shielding layer 12 and the conductive ring 14.

In the step of forming the vertical electrodes 22 and the horizontal electrodes 24, a plurality of vertical conductive units 26, a plurality of horizontal conductive units 30, and vertical wires 28 are disposed on the upper surface of the substrate 10, and each vertical wire 28 electrically connects adjacent vertical conductive units 26 to form a vertical electrode 22. The conductive ring 14, a plurality of peripheral wires 20, and horizontal wires 32 are simultaneously disposed on the upper surface of the substrate 10, and each horizontal wire 32 electrically connects the adjacent horizontal conductive units 30 to form a horizontal electrode 24. The peripheral wires 20 electrically connect the vertical electrodes 22 and the horizontal electrodes 24 to output signals generated by the vertical electrodes 22 and the horizontal electrodes 24 respectively. Besides, the peripheral wires 20 are electrically connected to a shielding pin of a FPC 16 and the conductive ring 14 is electrically connected to the shielding pin of the flexible printed circuit 16.

In an embodiment, the conductive ring 14, the peripheral wires 20, and the horizontal wires 32 are made of same conductive material, such as a metal or a transparent conductive material (such as ITO) or a combination thereof, such that the conductive ring 14, the peripheral wires 20, and the horizontal wires 32 can be simultaneously disposed on the upper surface of the substrate 10.

Figure 5:
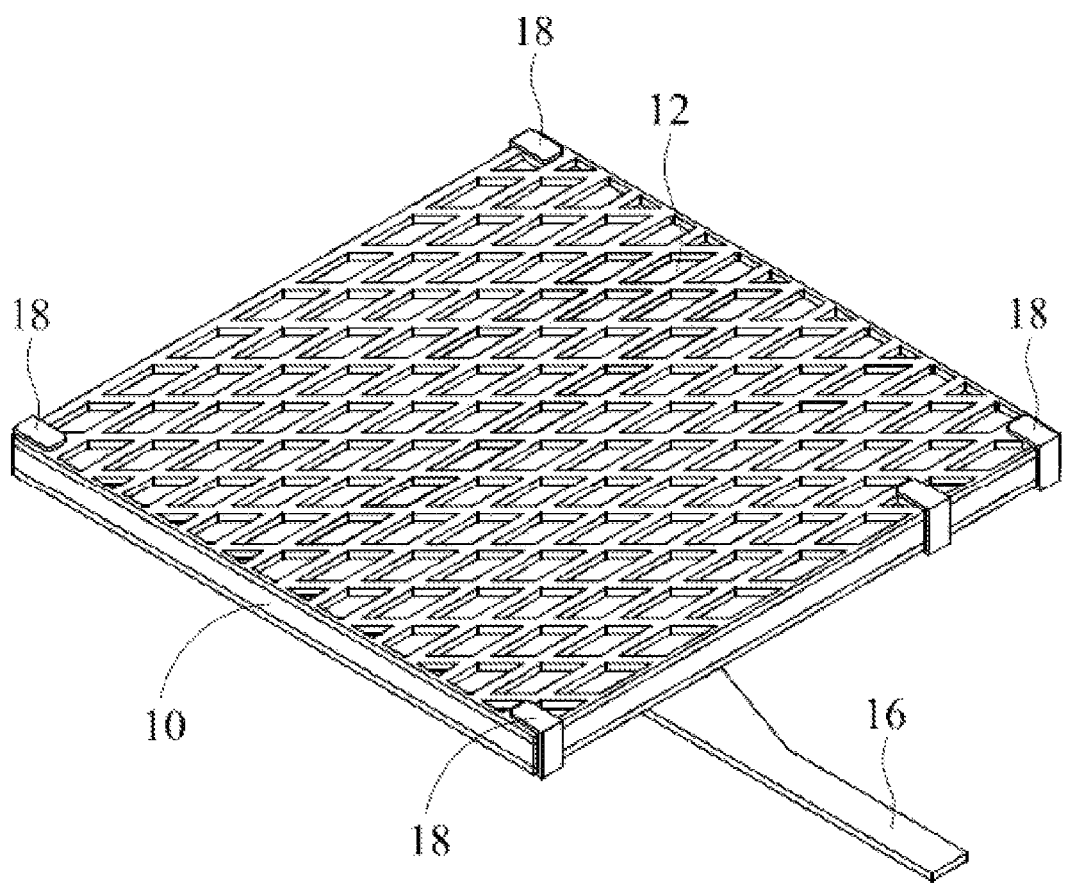
FIG. 5 is a schematic view of a lower surface of a substrate of a touch panel with a shielding layer having a mesh structure in accordance with another embodiment of the present disclosure.

The shielding layer 12 formed on the lower surface of the substrate 10 can have a plane structure or a mesh structure. For example, the shielding layer 12 of another embodiment has a mesh structure, as shown in FIG. 5. Furthermore, the shielding layer 12 is grounded.

In different embodiments, disposing positions of the conductive connection points 18 can be either at four corners of the substrate 10 or on four edges of the substrate 10, and each edge has at least one conductive connection point 18. For the disposing ways of the conductive connection points 18, the conductive connection points 18 can be disposed on the sides of the substrate 10. Besides, the substrate 10 further comprises a plurality of through-holes (not shown), which are disposed at positions corresponding to the shielding layer 12 and the conductive ring 14, and the conductive connection points 18 are disposed in the through-holes.

The above disposing positions and disposing ways of the conductive connection points 18 can be combined freely to achieve electrical connection of the shielding layer 12 and the conductive ring 14. For example, as shown in FIG. 1 and FIG. 2, the conductive connection points 18 are disposed at four corners of the substrate 10 and on the sides of the substrate 10 to electrically connect the shielding layer 12 and the conductive ring 14, wherein the conductive connection points 18 can be made of silver paste or conductive tape.

To sum up, the present disclosure provides a touch panel having a shielding structure and a method of manufacturing the same, by means of connecting a shielding layer and a conductive ring through conductive connection points, wherein impedance of the shielding layer is consistent for different distances between the shielding layer and a FPC, which eliminates noise interference from a liquid crystal display or any electronic device under the touch panel when using the touch panel. Moreover, manufacturing method of the touch panel through the present disclosure, with a shielding structure is a simple process, thereby reducing the manufacturing cost.

While certain embodiments have been shown and described, various modifications and substitutions may be made thereto without departing from the spirit and scope of the disclosure. Therefore, it is to be understood that the present disclosure has been described by way of illustration purpose only and not limitations.

What is claimed is:

1. A touch panel having a shielding structure, comprising:
   a plurality of electrodes disposed on a first surface of a substrate;
   a conductive ring disposed on a periphery of the first surface of the substrate and surrounding the plurality of electrodes;
   a shielding layer disposed on a second surface of the substrate, wherein a normal vector of the first surface pointing away from the substrate has a direction sufficiently opposite a normal vector of the second surface pointing away from the substrate; and
   a plurality of conductive connectors extending from the first surface to the second surface of the substrate for electrically connecting the shielding layer and the conductive ring, wherein each conductive connector has a first end in contact with the shielding layer and a second end in contact with the conductive ring.

2. The touch panel having the shielding structure of claim 1, wherein the conductive connectors are disposed at four corners of the substrate.

3. The touch panel having the shielding structure of claim 1, wherein the conductive connectors are disposed on four edges of the substrate, and each edge has at least one conductive connector.

4. The touch panel having the shielding structure of claim 2, wherein one of the conductive connectors is disposed on a third surface of the substrate, and another one of the conductive connectors are disposed on a fourth surface two opposite lateral surfaces of the substrate, wherein a normal vector of the third surface pointing away from the substrate has direction sufficiently opposite a normal vector of the fourth surface pointing away from the substrate, and wherein a normal vector of the third surface pointing away from the substrate has direction sufficiently perpendicular to the normal vector of the first surface pointing away from the substrate and the normal surface second surface of the pointing away from the substrate.

5. The touch panel having the shielding structure of claim 2, wherein the substrate further comprises a plurality of through-holes disposed at positions corresponding to the shielding layer and the conductive ring, and the conductive-connectors are disposed in the through-holes.

6. The touch panel having the shielding structure of claim 1, wherein the conductive connectors are made of silver pastes.

7. The touch panel having the shielding structure of claim 1, wherein the conductive connectors are made of conductive tapes.

8. The touch panel having the shielding structure of claim 1, wherein the shielding layer has a plane structure.

9. The touch panel having the shielding structure of claim 1, wherein the shielding layer has a mesh structure.

10. The touch panel having the shielding structure of claim 1, wherein the shielding layer is grounded.

11. The touch panel having the shielding structure of claim 1, wherein the conductive ring is electrically connected to a shielding pin of a flexible printed circuit.

12. The touch panel having the shielding structure of claim 1, wherein the shielding layer and the conductive ring are made of a conductive material.

13. The touch panel having the shielding structure of claim 1, wherein the plurality of electrodes comprise a plurality of conductive units and a plurality of wires electrically connecting the conductive units.

14. The touch panel having the shielding structure of claim 13, wherein the electrodes comprise a plurality of vertical electrodes and a plurality of horizontal electrodes.

15. The touch panel having the shielding structure of claim 13, wherein the conductive ring and the wires are made of the same conductive material.

16. The touch panel having the shielding structure of claim 13, further comprising a plurality of peripheral wires electrically connecting the electrodes, wherein the plurality of peripheral wires output signals generated by the electrodes.

17. The touch panel having the shielding structure of claim 16, wherein the peripheral wires, the conductive ring, and the conductive wires are made of the same conductive material.

18. A method of manufacturing a touch panel having a shielding structure, comprising:
    forming a plurality of electrodes on a first surface of a substrate;
    forming a shielding layer on a second surface of the substrate, wherein a normal vector of the first surface pointing away from the substrate has direction sufficiently opposite a normal vector of the second surface pointing away from the substrate;
    forming a conductive ring on a periphery of the first surface of the substrate; and
    disposing a plurality of conductive connectors extending from the first surface to the second surface of the substrate for electrically connecting the shielding layer and the conductive ring, wherein each conductive connector has a first end in contact with the shielding layer and a second end in contact with the conductive ring.

19. The method of manufacturing the touch panel having the shielding structure of claim 18, wherein one of the conductive connectors are is formed on a third surface of the substrate, and another one of the conductive connectors is disposed on a fourth surface of the substrate, wherein the third surface of the substrate is adjacent to the first and the second surfaces of the substrate, the fourth surface of the substrate is adjacent to the first and the second surfaces of the substrate, and the third surface of the substrate is opposite to the fourth surface of the substrate.

20. The method of manufacturing the touch panel having the shielding structure of claim 18, further comprising:
    forming a plurality of through-holes at positions corresponding to the shielding layer and the conductive ring of the substrate; and
    disposing the conductive connectors in the through-holes.

21. The method of manufacturing the touch panel having the shielding structure of claim 18, wherein the shielding layer is grounded.

22. The method of manufacturing the touch panel having the shielding structure of claim 18, wherein the conductive ring is electrically connected to a shielding pin of a flexible printed circuit.

23. The method of manufacturing the touch panel having the shielding structure of claim 18, wherein in the step of forming the electrodes on the first surface of the substrate, the electrodes comprise a plurality of conductive units and a plurality of wires electrically connecting the conductive units, the step further comprising:
    disposing the conductive units on the first surface of the substrate; and
    simultaneously disposing the wires and the conductive ring on the first surface of the substrate.

24. The method of manufacturing the touch panel having the shielding structure of claim 23, wherein in the step of forming the electrodes on the first surface of the substrate, the touch panel further comprises a plurality of peripheral wires electrically connecting the electrodes, the step further comprising:
    disposing the conductive units on the first surface of the substrate; and
    simultaneously disposing the peripheral wires, the wires, and the conductive ring on the first surface of the substrate.

25. The touch panel having the shielding structure of claim 3, wherein the conductive connectors are disposed on a third surface of the substrate, wherein a normal vector of the third surface pointing away from the substrate has direction sufficiently perpendicular to the normal vector of the first surface of the first surface pointing away from the substrate and the normal surface of the second surface pointing away from the substrate.

26. The touch panel having the shielding structure of claim 3, wherein the substrate further comprises a plurality of through-holes disposed at positions corresponding to the shielding layer and the conductive ring, and the conductive connectors are disposed in the through-holes.

27. The touch panel having the shielding structure of claim 1, wherein the plurality of conductive connectors are separated from each other.

28. The touch panel having the shielding structure of claim 18, wherein the plurality of conductive connectors are separated from each other.

* * * * *